United States Patent [19]
Park et al.

[11] Patent Number: 5,737,361
[45] Date of Patent: Apr. 7, 1998

[54] RECEIVER IN A DIRECT-SEQUENCE SPREAD-SPECTRUM COMMUNICATION SYSTEM USING A WINDOW FILTER

[75] Inventors: Jong-Hyeon Park, Seoul; Je-Woo Kim, Suwon, both of Rep. of Korea

[73] Assignee: SamSung Electronics Co., Ltd., Suwon, Rep. of Korea

[21] Appl. No.: 562,282

[22] Filed: Nov. 22, 1995

[30] Foreign Application Priority Data

Nov. 22, 1994 [KR] Rep. of Korea ............... 30742/1994

[51] Int. Cl.$^6$ ........................................... H04B 1/707
[52] U.S. Cl. ........................................... 375/208; 375/206
[58] Field of Search ................................ 375/200, 206, 375/207, 208, 209, 210

[56] References Cited

U.S. PATENT DOCUMENTS

| | | | |
|---|---|---|---|
| 5,151,921 | 9/1992 | Hashimoto | 375/208 |
| 5,166,952 | 11/1992 | Omurg et al. | 375/200 |
| 5,228,055 | 7/1993 | Uchida et al. | 375/206 |
| 5,311,544 | 5/1994 | Park et al. | 375/206 |
| 5,323,419 | 6/1994 | Mori et al. | 375/208 |
| 5,533,046 | 7/1996 | Lund | 375/200 |

FOREIGN PATENT DOCUMENTS

| | | |
|---|---|---|
| 701333 A2 | 3/1996 | European Pat. Off. |
| 4-47727 | 2/1992 | Japan. |
| 4-124925 | 4/1992 | Japan. |

*Primary Examiner*—Stephen Chin
*Assistant Examiner*—Jeffrey W. Gluck
*Attorney, Agent, or Firm*—Robert E. Bushnell, Esq.

[57] ABSTRACT

A receiver of a direct spread spectrum communication system with a window filter implemented to provide a portion of a correlation signal to a window peak detector while the complete correlation signal is being provided to a peak detector. The receiver demodulates data received in the spread spectrum signal by determining phase position information in response to peak detection signals generated by the peak detector and the window peak detector.

15 Claims, 4 Drawing Sheets

RECEIVER IN A DIRECT-SEQUENCE SPREAD-SPECTRUM COMMUNICATION SYSTEM USING A WINDOW FILTER

CROSS REFERENCE TO RELATED APPLICATIONS

This application makes reference to, incorporates the same herein, and claims all benefits accruing under 35 U.S.C §119 from an application entitled *Receiver Of Direct Spread Communication System Through Window Filter* earlier filed in the Korean Industrial Property Office on 22 Nov. 1994, which was duly assigned Ser. No. 30742/1994 by that Office.

BACKGROUND OF THE INVENTION

The present invention relates to a direct sequence spread spectrum communication system, and more particularly, to a process and a receiver for a direct sequence spread spectrum communication system using a window filter.

In general, a direct spread spectrum communication system receiver despreads a received signal which was directly spread, and then demodulates the despread signal to obtain the original data. It is known in one type of conventional direct spread spectrum communication system receiver to despread a received pseudonoise (PN) code by generating a local replica of the PN code in the receiver and then synchronize this local PN signal to the one which is superimposed on the received waveform.

The operation of another type of conventional direct spread spectrum communication system receiver will be explained as follows. First, a first mixer inputs a signal received through an antenna and inputs a carrier generated by a local carrier generator and mixes these two input signals to output a first mixed signal. Thereafter, a band pass filter inputs and filters the first mixed signal to output a filtered intermediate frequency signal.

An I-channel mixer inputs the filtered intermediate frequency signal and an in-phase component of a locally generated intermediate frequency signal generated by a local intermediate frequency generator. The I-channel mixer mixes the two input signals to thereby output an I-channel base band spread spectrum signal from which the intermediate frequency component is eliminated from the filtered intermediate frequency signal. A phase convertor inputs the locally generated intermediate frequency signal generated by the intermediate frequency generator and phase-changes it by π/2 to thereby output an orthogonal component of the locally generated intermediate frequency signal. A Q-channel mixer inputs the orthogonal component of the locally generated intermediate frequency signal output from the phase convertor and the filtered intermediate frequency signal, and mixes the two input signals to thereby output a Q-channel base band spread spectrum signal from which the intermediate frequency component is eliminated from the filtered intermediate frequency signal.

First and second low pass filters respectively input the I and Q-channel base band spread spectrum signals and output low pass filtered I and Q-channel base band spread spectrum signals. Further, first and second A/D convertors respectively input the low pass filtered I and Q-channel base band spread spectrum signals and convert them into I and Q-channel digital signals.

First and second correlators each input a reference pseudonoise (PN) code from a reference PN code generator and also respectively input the I and Q-channel digital signals to thereby correlate the I and Q-channel digital signals with the reference PN code. Thereafter, the first and second correlators output correlation values of the I and Q-channels.

First and second squaring circuits respectively input the correlation values of the I and Q-channels, and then output them after a known squaring operation. An adder inputs the squared correlation values of the I and Q-channels and adds the two correlation values to thereby output them as a sum signal. A square root circuit inputs the sum signal and outputs a correlation signal after a square root operation.

A peak detector inputs the correlation signal and detects and outputs an uppermost peak value of the correlation signal input from a data starting point up to a data ending point for every data demodulation period, depending upon phase location information to be input from a period counter.

A demodulator inputs a peak value from the peak detector and, in response to input of the peak value, it stores the correlation values of the I and Q-channels input from the first and second correlators. In addition, the demodulator demodulates the original data from the correlation values of the stored I and Q-channels at a point of time when the data is demodulated according to the phase location information to thereby output it as demodulation data.

A peak location detector inputs the peak value from the peak detector and, in response to input of the peak value, it stores the phase location information input from the period counter. Thereafter, the peak location detector outputs the stored phase location information as a peak location value at a point of time when the data is demodulated in one data interval.

A timing recovery loop inputs the peak location value for every data demodulation point and recognizes the location information from which the true peak value is detected. Then, the timing recovery loop outputs a recovery signal so that the uppermost peak point is detected from a count value of a predetermined period in a next data interval. That is, the timing recovery loop obtains a phase difference from the location information and the predetermined period count value from which the peak point is detected, and produces the recovery signal to control a count timing of the period counter so that the phase difference can arrive at the minimum value, thereby outputting the signal to the period counter.

The period counter, having an output signal whose generation timing is controlled by the recovery signal, outputs a control signal and the phase location information to determine the starting point of the data demodulation period and the point of time when the data is demodulated. Namely, the period counter divides one data interval into plural phases and then counts in series each phase to output the phase location information mapped onto each location by the phase. Thereafter, after ending one data interval, the control signal is generated to indicate the starting point of the data demodulation period and the point of time when the data is demodulated. Since an accurate count time of the true period counter is subject to continuous control from the timing recovery loop, the count time of the period counter can be minutely changed. Such a change in the count time is controlled to minimize a phase error of the receiving signal and the reference signal. This results in pursuing synchronization and recovering a clock.

There is a problem however, which is caused by this just described direct spread spectrum communication system receiver because the receiving signal is degraded due to noise and interference on the channel. That is, if the receiving signal is degraded because of the noise on the channel, an original correlation feature included in the PN signal can not be maintained in the output of the squaring circuit. Therefore, it is impossible to perform pursuit of synchronization and timing recovery and thus there arises a problem because an error is generated during data demodulation.

Moreover, in the case of a radio channel, the direct spread spectrum communication system receiver may either change the envelope of the receiving signal or generate a multipath signal due to fading or shadowing. As mentioned above, however, there also arises in this case a problem because error is generated when demodulating the data owing to the synchronization pursuit and the timing recovery error.

SUMMARY OF THE INVENTION

It is an object of the present invention to provide an improved direct sequence spread spectrum communication process and system.

It is another object to provide a digital process and receiver of a direct sequence spread spectrum communication system capable of demodulating data even in the presence of degradation of a received signal due to a noise and an interference on a channel.

It is still another object to provide a digital process and receiver for a direct spread spectrum communication system capable of demodulating data regardless of envelope variation in the received signal or the presence of a multipath signal attributable to fading or shadowing of a radio channel.

These and other objects may be achieved with a process and a receiver for a direct sequence spread spectrum communication system having a receiving unit for converting a received signal into an intermediate frequency signal, for converting the intermediate frequency signal into I and Q-channel base band signals, for correlating the I and Q-channel base band signals with a reference pseudonoise code to produce I and Q-channel correlation values, respectively, for squaring the I and Q-channel correlation values to produce squared I and Q-channel correlation values, for adding the squared I and Q-channel correlation values to produce a sum signal, and for generating a correlation signal by performing a square root operation on the sum signal. Practice of the process and construction of the system contemplate a receiver with a peak detector for producing a first peak detection value by detecting an uppermost peak value of the correlation signal in response to a first control signal indicative of a starting point and a demodulating point of a data interval; a window filter and a window peak detector for producing a window peak detection value by detecting an uppermost peak value of a portion of the correlation signal in response to the first control signal; a period counter for generating the first control signal and for producing phase location information signals by dividing a data interval into a plurality of phases; a peak location detector responsive to the first peak detection value for storing and providing a first peak location signal indicative of the phase location information signal being produced when the peak location detector receives the first peak detection value; a window peak location detector responsive to the window peak detection value for storing and providing a second peak location signal indicative of the phase location information signal being produced when the window peak location detector receives the window peak detection value; a comparator for comparing the first peak location signal and the window peak location signal for providing a comparing signal having a state based on a comparison result; a synchronization detector for providing a checking signal by checking an initial synchronization establishment state in response to the comparing signal; a first selector having a selection terminal for receiving the checking signal and having a first input and a second input for respectively receiving the first peak location signal and the window peak location signal, the first selector selectively transmitting one of the first and window peak location signals in response to the checking signal; a second selector having a selection terminal for receiving the checking signal and having a fast input and a second input for respectively receiving the first peak detection signal and the window peak detection signal, the second selector selectively transmitting one of the first and window peak detection signals in response to the checking signal; a timing recovery loop for generating a timing recovery signal in response to one of the first and window peak location signals transmitted by the first selector for controlling timing of the period counter to enable the phase location information to be changed; and a data demodulator connected to receive the I and Q-channel correlation values, and in response to one of the first and window peak detection signals selectively received from the second selector, demodulate the I and Q-channel correlation values to output data transmitted in the spread spectrum signal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

In the following detailed description, many specific details are set forth to provide a more thorough understanding of the present invention. It will be apparent, however, to those skilled in the art, that the present invention may be practiced without these specific details. In other instances, well known circuits have not been described so as not to obscure the present invention.

DETAILED DESCRIPTION OF THE PREFERRED EMBODIMENT

Figure 1:
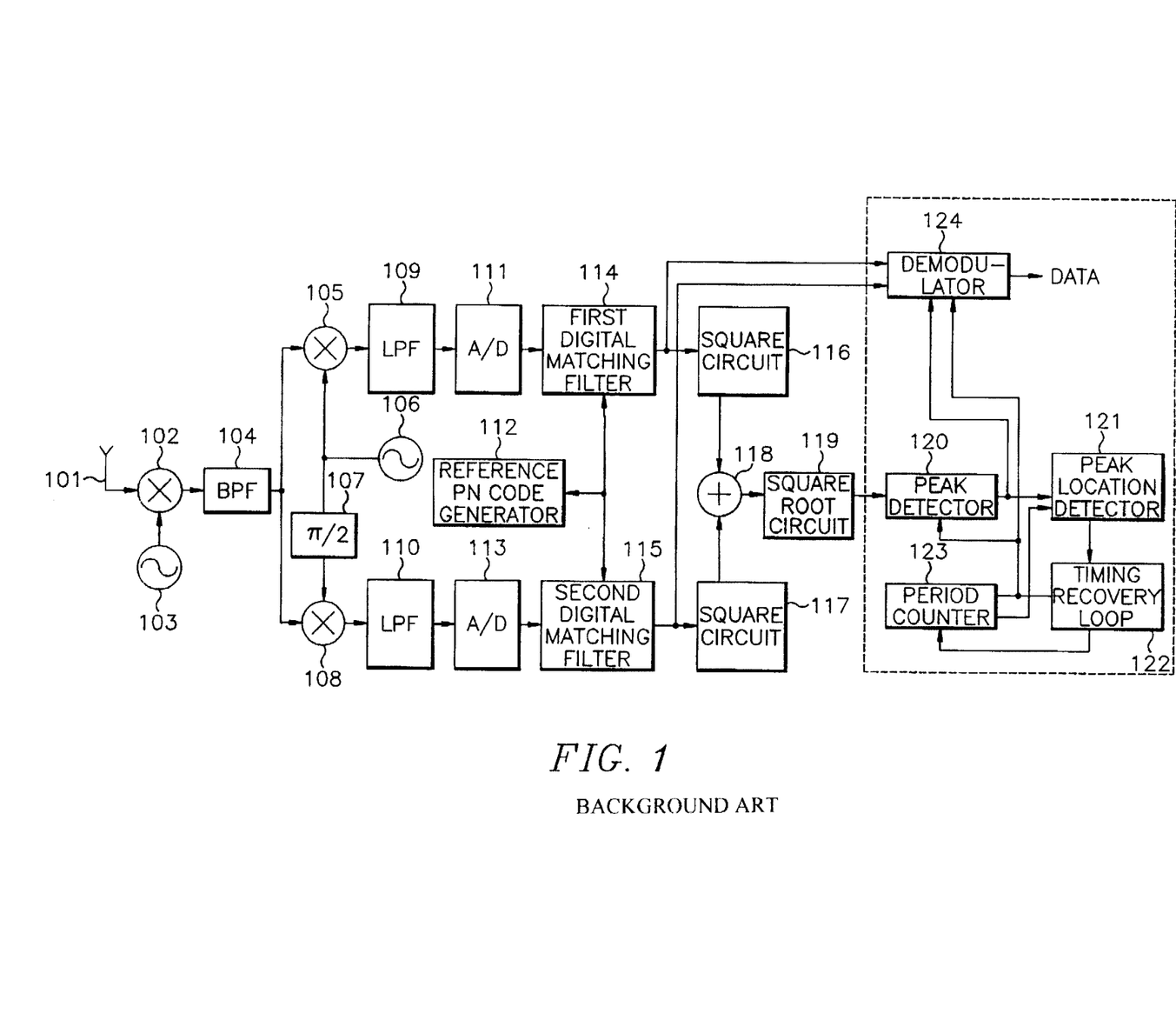
FIG. 1 illustrates a simplified block diagram providing an abstract representation of salient features of a typical direct spread spectrum communication system receiver.

In general, and as shown in FIG. 1, a receiver for a direct sequence spread spectrum communication system typically despreads a received signal and recovers original data by demodulation. Referring to FIG. 1, the operation of the receiver to demodulate the data from the received signal will be explained as follows.

A signal received through an antenna 101 and a local carrier generated by carrier generator 103 are input to mixer 102 which mixes the two signals to provide a mixed signal. Band pass filter 104 inputs and filters the mixed signal in order to provide a filtered signal converted into an intermediate frequency signal.

The output of band pass filter 104 and an in-phase component of a local oscillator signal generated by oscillator 106 are mixed in an I-channel mixer 105 to thereby provide an I-channel base band spread spectrum signal. A phase convertor 107 phase-changes the local oscillator signal by π/2 to provide an orthogonal oscillator signal. A Q-channel mixer 108 mixes the orthogonal oscillator signal and the output of band pass filter 104 to thereby generate a Q-channel base band spread spectrum signal.

Low pass filters 109 and 110 respectively input the I and Q-channel base band spread spectrum signals and pass low pass filtered I and Q-channel signals. Analog-to-digital convertors 111 and 113 respectively input the I and Q-channel low pass filtered signals and convert them into I and Q-channel digital signals.

Digital matching filters 114 and 115 input a reference pseudonoise PN code from a reference pseudonoise code generator 112 and respectively input the I and Q-channel digital signals to thereby correlate the digital signals with the reference PN pseudonoise code. Thereafter, digital matching filters 114 and 115 pass correlation values for the I and Q-channels.

Squaring circuits 116 and 117 input the correlation values of the I and Q-channels, respectively, and then provide squared I and Q-channel correlation values. An adder 118 inputs the squared I and Q-channel correlation values, sums the two correlation values and provides a sum signal. A square root circuit 119 performs a square root operation on the sum signal to provide a correlation signal.

A peak detector 120 inputs the correlation signal received from square root circuit 119 and detects and outputs an uppermost peak value of the correlation signal from a data starting point up to a data ending point every data demodulation period depending upon phase location information received from a period counter 123.

A peak location detector 121 inputs the peak value output by peak detector 120 and, in response to input of the peak value, stores the phase location information received from period counter 123. Thereafter, peak location detector 121 provides the stored phase location information as a peak location value at a point in time in which data is demodulated during one data interval.

A timing recovery loop 122 inputs the peak location value every data demodulation point and recognizes the location information from which the true peak value is detected. Then, timing recovery loop 122 outputs a recovery signal so that the uppermost peak point is detected from a count value of a predetermined period within a next data interval. That is, timing recovery loop 122 obtains a phase difference from the location information and the predetermined period count value from which the peak point is detected, and produces the recovery signal to control count timing of period counter 123 so that the phase difference is at a minimum value, thereby providing the recovery signal to period counter 123.

The period counter 123 has an output signal whose timing is controlled by the recovery signal. Period counter 123 generates a control signal and the phase location information to determine the starting point of the data demodulation period and the point of time the data is demodulated. Namely, period counter 123 divides one data interval into plural phases and then counts in series each phase in order to generate the phase location information mapped onto each location by the phase. Thereafter, after ending one data interval, the control signal is generated to indicate the starting point of the data demodulation period and the point of time the data is demodulated. Since the accurate count time of period counter 123 is subject to being continuously controlled by timing recovery loop 122, the counting time of the period counter can be minutely changed. Such a change in the counting time is controlled to minimize a phase error resulting from pursuing synchronization and clock recovery.

A demodulator 124 inputs a peak value from peak detector 120 and in response to input of the peak value, stores the correlation values of the I and Q-channels received from digital matching filters 114 and 115. In addition, demodulator 124 demodulates the original data from the stored correlation values at a point in time according to the phase location information output by period counter 123 to thereby generate demodulated data.

Figure 2A:
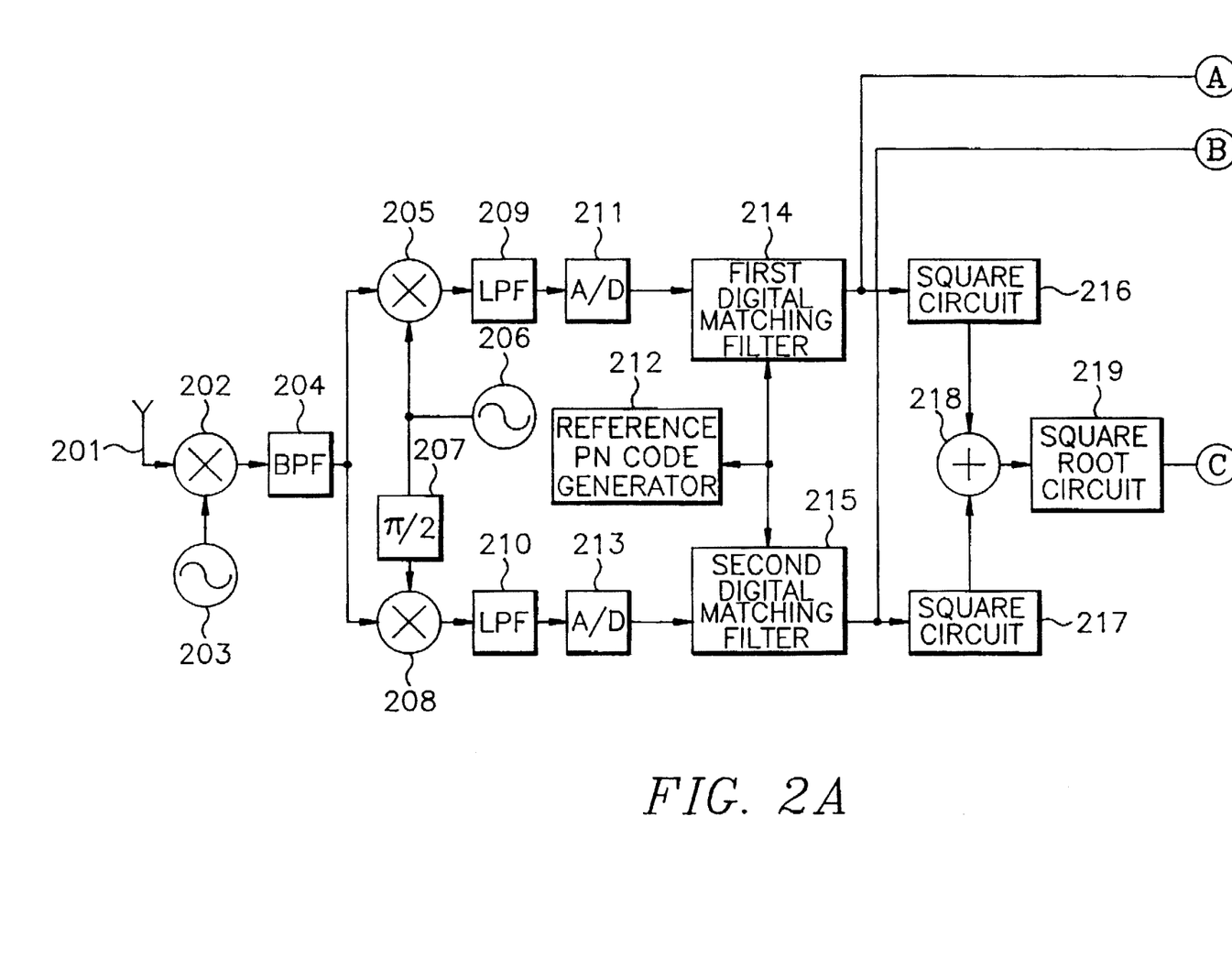
FIGS. 2A and 2B are adjoining block diagrams illustrating a spread spectrum communication receiver constructed according to the principles of the present invention with a window filter.
Figure 2B:
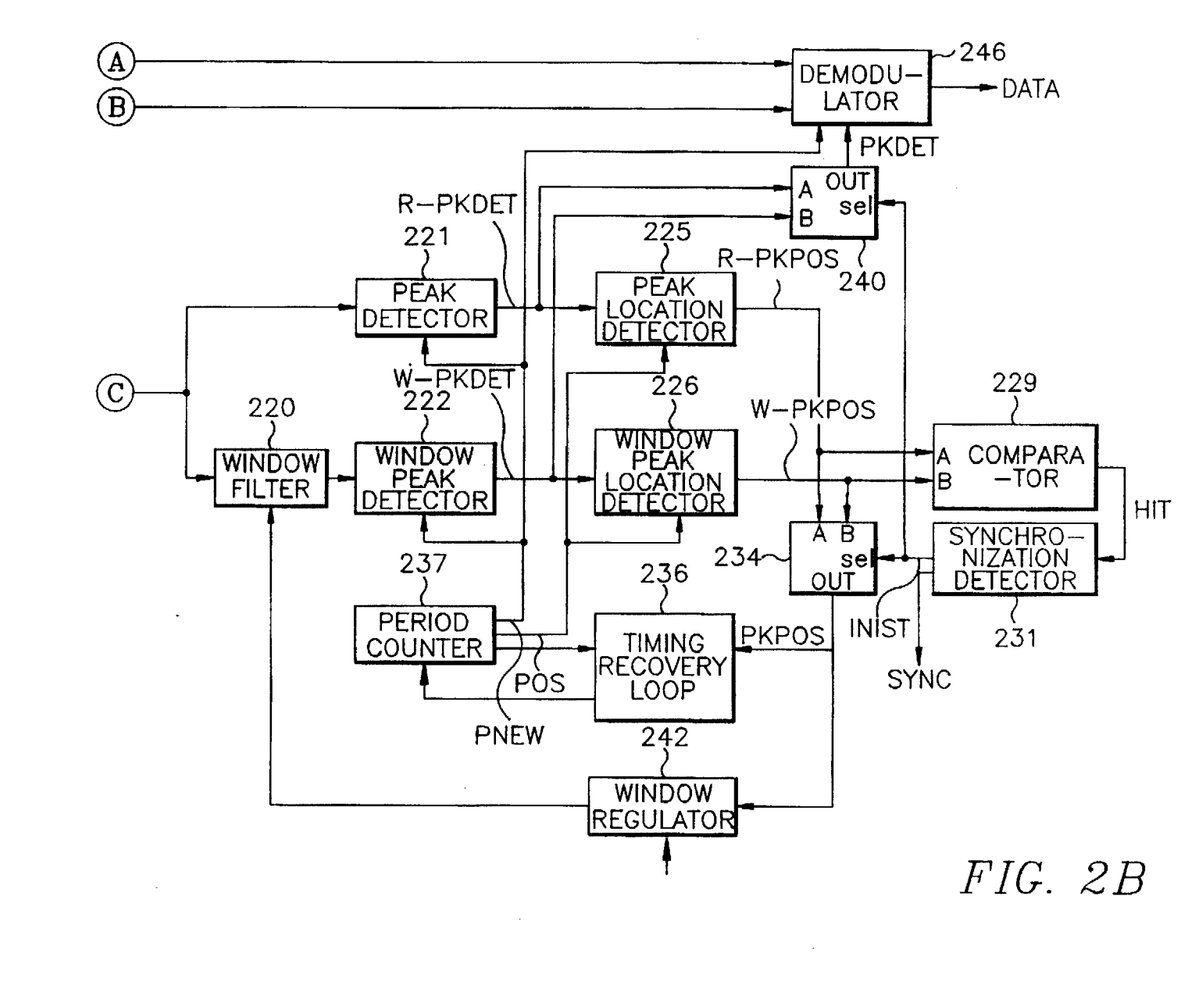

Adjoining FIGS. 2A and 2B together provide a block diagram illustrating a spread spectrum communication receiver using a window filter constructed according to the principles of the present invention. Referring now to FIG. 2A, a signal received through an antenna 201 and a local carrier generated by carrier generator 203 are input to mixer 202 which mixes the two signals to generate a mixed signal. Band pass filter 204 inputs and filters the mixed signal and provides a filtered signal that has been converted into an intermediate frequency signal.

The output of band pass filter 204 and an in-phase component of a local oscillator signal generated by oscillator 206 are mixed in an I-channel mixer 205 to thereby provide an I-channel base band spread spectrum signal. A phase convertor 207 phase changes the local oscillator signal by π/2 and provides an orthogonal oscillator signal. A Q-channel mixer 208 mixes the orthogonal oscillator signal and the output of band pass filter 204 to thereby generate a Q-channel base band spread spectrum signal.

Low pass filters 209 and 210 respectively input the I and Q-channel base band spread spectrum signals and pass low pass filtered I and Q-channel signals. Analog-to-digital convertors 211 and 213 respectively input the I and Q-channel low pass filtered signals and convert them into I and Q-channel digital signals.

Digital matching filters 214 and 215 input a reference PN pseudonoise code from a reference PN pseudonoise code generator 212 and respectively input the I and Q-channel digital signals to thereby correlate the digital signals with the reference PN pseudonoise code. Thereafter, digital matching filters 214 and 215 output correlation values of the I and Q-channels.

Squaring circuits 216 and 217 input the correlation values of the I and Q-channels, respectively, and then provide squared I and Q-channel correlation values. An adder 218 inputs the squared I and Q-channel correlation values, sums the two correlation values and provides a sum signal. A square root circuit 219 performs a square root operation on the sum signal to provide a correlation signal.

Now, referring to FIG. 2B, a peak detector 221 inputs the correlation signal received from square root circuit 219, of FIG. 2A, detects and provides an uppermost peak value of the correlation signal in response to a control signal PNEW which determines the starting point and the demodulating point of each data interval. Accordingly, peak detector 221 provides a peak detection value R-PKDET for each data interval.

A window filter 220, whose filtering range is limited by a window size signal, inputs the correlation signal received from square root circuit 219, of FIG. 2A, and passes a window filtered signal. A window peak detector 222 recognizes each data interval in response to control signal PNEW and then inputs the window filtered signal to detect the uppermost peak value among the window filtered signals received during each data interval. Thereafter, window peak detector 222 generates a window peak detection value W-PKDET.

A peak location detector 225 receives peak detection value R-PKDET, output from peak detector 221, and stores phase location information POS, received from period counter 237, when peak detection value R-PKDET is received. Thereafter, peak location detector 225 provides the stored phase location information POS as a peak location signal R-PKPOS at a point in time in which data is demodulated during one data interval.

A window peak location detector 226 receives window peak detection value W-PKDET from window peak detector 222, and stores phase location information POS from period counter 237, when the window peak detection value W-PKDET is received. Thereafter, the window peak location detector 226 provides the stored phase location information POS as a window peak location signal W-PKPOS at a point in time in which data is demodulated during one data interval.

A comparator 229 receives peak location signal R-PKPOS and window peak location signal W-PKPOS, and then compares these two signals. When the peak locations of these two signals are equal, comparator 229 generates a comparing signal HIT having a value "1". On the other hand, when the two compared input peak location signals are not equal, a comparing signal HIT having a value "0" is generated. Comparing signal HIT equal to "1" indicates a state that the sequence of the PN code of the received signal band converted to the I and Q-channels and the sequence of the reference PN code coincide with each other within one chip.

A synchronization detector 231, which can be constructed as a state machine, changes a synchronization state in response to comparing signal HIT, and thus checks the initial state and outputs a checking signal INIST to confirm the result of the initial state checking operation. Thereafter, synchronization detector 231 provides synchronization signals SYNC corresponding to input states of the comparing signal HIT.

A selector 234 inputs the peak location signal R-PKPOS and the window peak location signal W-PKPOS, and then transmits a selected one of the two input signals, as signal PKPOS, under control of checking signal INIST.

Another selector 240 inputs the peak detection value R-PKDET and the window peak detection value W-PKDET, and then transmits a selected one of the two input signals, as signal PKDET, under control of the checking signal INIST.

A window regulator 242 inputs a predetermined window size signal and the signal transmitted by selector 234 and then regulates the window size signal in response to the output signal of the selector 234.

A timing recovery loop 236 inputs signal PKPOS transmitted by selector 234 and then outputs a corresponding timing recovery signal.

Period counter 237 provides control signal PNEW which determines the starting point and the demodulating point of the data of a predetermined data interval, and also transmits phase location information POS obtained by dividing the data interval.

A demodulator 246 inputs the correlation values of the successive I and Q-channels and, in response to signal PKDET from selector 240, updates and stores the correlation values of the I and Q-channels. Further, demodulator 246 demodulates and provides the transmitted data from the stored correlation values of the I and Q-channels which are currently stored at the demodulation point of the data according to control signal PNEW received from period counter 237.

Figure 3:
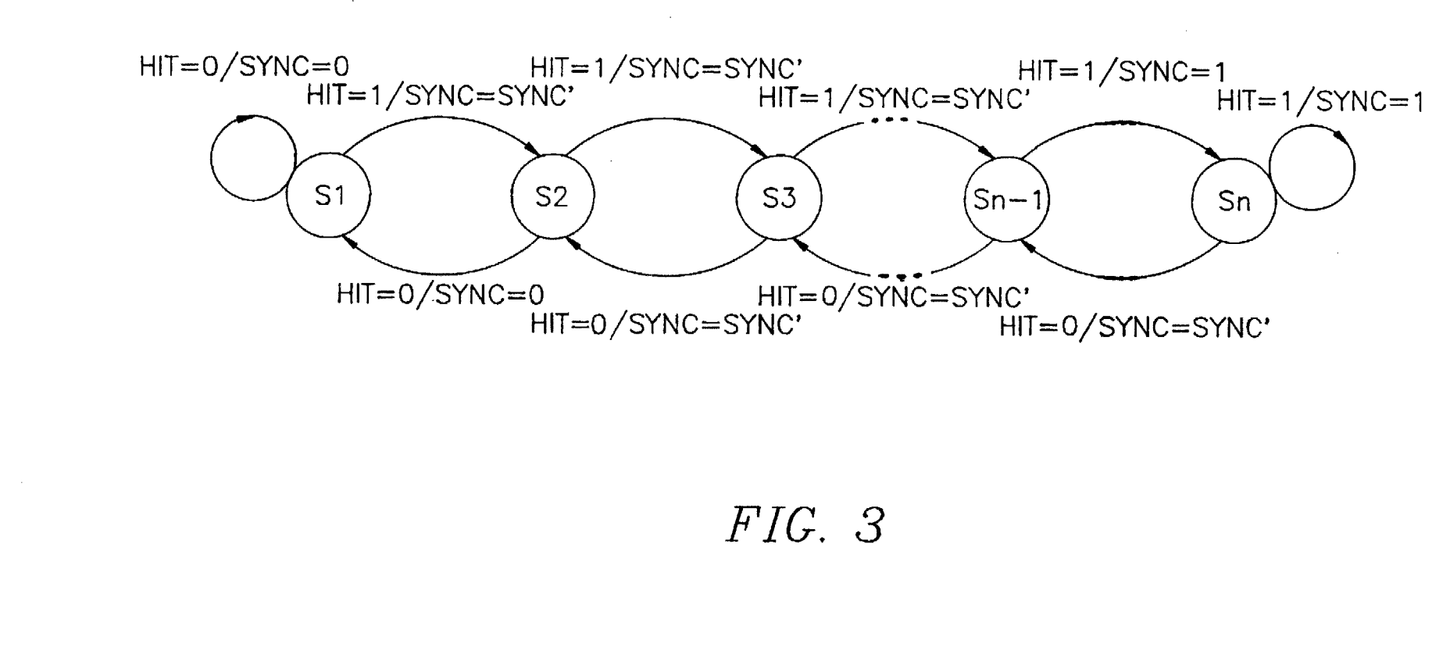
FIG. 3 is a diagram illustrating a transition state for detecting initial synchronization by the synchronization detector of FIG. 2B in accordance with the principles of the present invention.

FIG. 3 shows a transition state diagram for detecting initial synchronization from a synchronization detector constructed in accordance with the circuit shown by FIG. 2 to be described below.

Referring collectively now to FIGS. 2A, 2B and 3, one preferred embodiment of the present invention will be explained in detail hereinafter.

Mixer 202 inputs the received signal from antenna 201 and the local carrier from carrier generator 203, mixes the two input signals and provides a mixed signal. Band pass filter 204 inputs and filters the mixed signal and passes the filtered signal converted into the intermediate frequency signal.

Then, I-channel mixer 205 receives the filtered signal and the in-phase component of the local oscillator signal generated by oscillator 206, eliminates the intermediate frequency component and provides the I-channel base band spread spectrum signal. Phase convertor 207 inputs the local oscillator signal, and makes a phase transition by $\pi/2$ to provide the orthogonal component of the local oscillator signal. Q-channel mixer 208 inputs the filtered signal and the orthogonal component, and eliminates the intermediate frequency component to provide the Q-channel base band spread spectrum signal.

Low pass filters 209 and 210 respectively input the I and Q-channel base band spread spectrum signals and pass the low pass filtered I and Q-channel signals as respective inputs to A/D convertors 211 and 213. A/D converters 211 and 213 convert the I and Q-channel signals into the I and Q-channel digital signals.

Digital matching filters 214 and 215 respectively correlate the reference PN pseudonoise code generated by reference PN pseudonoise code generator 212 with the I and Q-channel digital signals to provide the correlation values of the I and Q channels, respectively.

Squaring circuits 216 and 217 respectively square the correlation values of the I and Q-channels from digital matching filters 214 and 215. Adder 218 sums the squared I and Q-channel correlation values from squaring circuits 216 and 217 and provides a sum signal. A square root circuit 219 performs a square root operation on the sum signal and provides a correlation signal.

Peak detector 221 and a window peak detector 222 detect an uppermost peak value for every data demodulation period, wherein peak detector 221 detects the peak value by using the correlation signal from square root circuit 219 and provides the peak detection value R-PKDET which is indicative of the largest peak value detected during the data demodulation period. Window peak detector 222, on the other hand, detects the peak value by using a filtered correlation value received from window filter 220. Window filter 220 passes that portion of the correlation signal received from square root circuit 219 which is within the window whose size is controlled by window regulator 242, and generates a value "0" for those portions of the correlation signal provided by the square root circuit 219 but which were not passed by window filter 220. Accordingly, window peak detector 222 provides the window peak detection value W-PKDET to indicate that a new peak is observed whenever the uppermost peak value is observed.

Peak detector 221 detects the uppermost one of all of the output values of the correlation signal generated by square root circuit 219 during a data duration corresponding to the control signal PNEW, and then provides the peak detection value R-PKDET. Window peak detector 222 detects the uppermost peak among samples within the window of a specific size of the output values of the correlation signal output by square root circuit 219 during a data duration corresponding to the control signal PNEW, and then provides the window peak detection value W-PKDET.

Signals R-PKDET and W-PKDET respectively inform peak location detector 225 and window peak location detector 226 that the uppermost peak values were observed by peak detector 221 and window peak detector 222. Accordingly, peak location detector 225 and window peak location detector 226 store the phase location information POS of the current peak location information provided by period counter 237. Thereafter, peak location detector 225 and window peak location detector 226 output the location information R-PKPOS and W-PKPOS, respectively, of each uppermost peak value at the point in a time of data demodulation after ending one duration.

In other words, peak location detector 225 stores the phase location information POS input from the period counter 237 at the point of the time it receives the peak detection value from the peak detector 221. Then, the peak location detector 225 outputs the uppermost phase location information POS of the phase location information POS stored during one data duration after ending the other data duration, as the peak location signal R-PKPOS. The window peak location detector 226 stores the phase location information POS received from the period counter 237 at the point of the time it receives the window peak detection value W-PKDET from the window peak detector 222. Then, the window peak location detector 226 provides the uppermost phase location information POS of the phase location information POS stored during one data duration after ending the other data duration, as the window peak location signal W-PKPOS.

Comparator 229 compares the peak location signal R-PKPOS from peak location detector 225 and the window peak location signal W-PKPOS from window peak location detector 226 and generates a result of such a comparison as the comparing signal HIT. When the phase locations of the two input signals are equal to each other, the comparing signal HIT having a value "1" is generated. On the other hand, when the phase locations of the two input signals are not equal to each other, comparing signal HIT having a value "0" is generated. The comparing signal HIT mentioned above indicates a state where the sequence of the PN pseudonoise code of the received signal and the sequence of the reference PN pseudonoise code coincide with each other within one chip.

Synchronization detector 231 inputs the comparing signal HIT and in response to the state of signal HIT, provides the synchronization signal SYNC to indicate that the initial synchronization or an effective receiving signal is sensed. At this point, the synchronization signal SYNC indicates a state of establishing initial synchronization and can be used as a carrier sensing signal to indicate an effective received signal, in a radio LAN or a radio telephone for example.

Synchronization detector 231 may be comprised of a known state machine and FIG. 3 shows an example of such a state machine. In particular, FIG. 3 shows one example of the state machine to be changed in the direction of serially increasing a state on a basis of the comparing signal HIT exhibiting a binary value "1" status, and to be changed step-by-step up and step-by-step down methods in the direction of serially reducing the state according to the comparing signal HIT with a binary value of "0".

In the operation of the state machine of FIG. 3, an initial state is set at a state "S1". Further, since the synchronization has not yet been established, there is generated a synchronization signal with a binary value of "0". When the comparing signal HIT with a binary value of "0" is input in the state "S1", there is no transition for the state and the state will continuously be at the state "S1" and the synchronization signal with a binary value of "0" to inform that the synchronization has not yet been established. In other words, when the comparing signal HIT with a binary value of "0" is input, the next state also indicates the state "S1" and there is generated a synchronization signal with a binary value of "0" to indicate that synchronization has not yet been established. When the comparing signal HIT with a binary value of "1", is input in the state "S1", the state progresses to the state "S2" and there is generated a synchronization signal SYNC containing the state of the previous synchronization signal SYNC'. Therefore, when the state is changed to state "S2" from state "S1", since the binary value of the previous synchronization signal SYNC' is "0", the output synchronization signal SYNC is "0".

In addition, when the comparing signal HIT with a binary value of "0" is input at state "S2", the state is changed to state "S1" and the synchronization signal SYNC is output with a binary value of "0". Further, when the comparing signal HIT with a binary value of "1" is input at the state "S2", the state is changed to state "S3" and the synchronization signal SYNC is output containing the previous binary value as it is, unchanged.

According to this operation, the state is continuously changed and the state progresses to state "$S_{n-1}$" thereby. When the comparing signal HIT with a binary value of "1" is input in the state "$S_{n-1}$", the state is changed to the last state $S_n$ and the synchronization signal SYNC with a binary value of "1" is output to inform that the synchronization was established. Moreover, when the comparing signal HIT with a binary value of "1" is input in the last state $S_n$, the state continuously stays in the state $S_n$ and the synchronization signal SYNC with a binary value of "1" is output. When the comparing signal HIT with a binary value of "0" is input in the state $S_n$, the state is changed to the state $S_{n-1}$ and the synchronization signal SYNC with a binary value of "1" is output since the synchronization signal SYNC has the state of the previous synchronization signal SYNC'.

When the comparing signal HIT with a binary value of "0" is consecutively input in the state $S_n$, the state progresses in the direction of reduction and at last, it arrives at the initial state S1 to output the synchronization signal with a binary value of "0" to indicate either loss of synchronization or that the received signal is not effective.

In the meantime, synchronization detector 231 checks a state of the state machine in addition to the above synchronization signal. When the state is at the state "S1", the checking signal INIST with a binary value of "0" is output, otherwise, the checking signal with a binary value of "1" is output.

First selector 234 inputs the peak location signal R-PKPOS through an input terminal A and also inputs the window peak location signal W-PKPOS through an input terminal B. Thereafter, first selector 234 receives from synchronization detector 231 a checking signal INIST at a select terminal, sel. When the checking signal INIST with a binary value of "0" is received, first selector 234 outputs at output terminal OUT the signal input to terminal A, i.e., R-PKPOS, as the uppermost peak location signal PKPOS. On the other hand, when the checking signal INIST with a binary value of "1" is input at selected terminal sel, first selector 234 provides at output terminal OUT the signal received on input terminal B, i.e., W-PKPOS, as the uppermost peak location signal PKPOS.

Second selector 240 receives peak detection value R-PKDET through input terminal A, receives window filter value W-PKDET through input terminal B, and receives checking signal INIST at select terminal sel. In response to the input state of the checking signal INIST, second selector 240 selects either peak detection value R-PKDET or window peak detection value W-PKDET for transmission at output terminal OUT the uppermost peak detection signal PKDET to indicate that the uppermost peak value is detected.

Window regulator 242 receives the uppermost peak location signal PKPOS from the selector 234 and in response to the uppermost peak location signal PKPOS, regulates the window size of window filter 220. Here, it is well known to one skilled in the art that it is possible to externally regulate the window size of window filter 220.

Window filter 220 filters a correlation signal received from square root circuit 219 within a range of a window size provided by the window regulator 242 and then outputs a "0" when the correlation signal is outside of the range of the window size by eliminating that portion of the correlation signal outside of the window range.

Meanwhile, timing recovery loop 236 receives the uppermost peak location signal PKPOS at the point of time of data demodulation whenever a data duration is ended, and then controls period counter 237 to enable the phase location information to be changed so that the uppermost peak is observed in a specific location during the next data duration. That is, a phase error is obtained from the difference between the specific location where the peak is expected to occur and the location where the true uppermost peak is obtained from timing recovery loop 236. Period counter 237 is controlled to reduce such a phase error.

Period counter 237 provides control signal PNEW to determine the data starting point and the data demodulation time, and also provides the phase location information signal POS. In other words, the period counter 237 divides one data duration into plural phases and counts each phase in series in order to generate information mapped onto each location. After ending one data duration, period counter 237 generates control signal PNEW to indicate the data demodulation point and the data starting point. At the moment, since an accurate count time by period counter 237 is continuously controlled by a timing recovery signal generated by timing recovery loop 236, there is a possibility of minutely changing the period count time. The minute change in the period count time is controlled in order to minimize the phase error between the pseudonoise code PN of the received signal and the reference PN pseudonoise code. This results in synchronization and recovery of a clock.

In addition, in response to the uppermost peak detection signal PKDET demodulator 246 update-latches the correlation values of the I and Q-channels received from digital matching filters 214 and 215. At this moment, when period counter 237 indicates the data demodulation time, demodulator 246 recovers the data from the stored I and Q channel correlation values.

Schematically, window filter 220 passes only the correlation signals generated by square root circuit 219 which are near the observed location of the uppermost peak from a previous data duration. This results in a function of eliminating various noises or the multipath signals from the received signal having the multipath signal affected with the channel noise, an intentional/unintended noise, fading or shadowing.

As mentioned above, when there is noise or a multipath signal, the process method through the window is employed to enable a receiver to reduce data demodulation error and timing recovery error. That is, there is provided in the present invention a capability of demodulating the data by eliminating, through the window filtering, the degradation of the received signal deleteriously effected by noise or interference within a transmission channel. Moreover, the present invention advantageously reduces the data demodulation error and the timing recovery error by elimination of these unwanted signals through window filtering whenever there is an envelope variation or a multipath signal caused due to fading or shadowing of the radio transmission channel. Furthermore, the present invention may be employed to compare the result of the outstanding window filtering process with the result of the conducted window filtering process. Then, according to the result of the comparison, a state of synchronization establishment is detected, and this results in a heightened possibility of establishing data synchronization.

While there have been illustrated and described what is to be considered to be the preferred embodiment of the present invention, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A receiver in a direct sequence spread spectrum communication system for demodulating a spread spectrum signal, said spread spectrum signal having been converted into correlation signal by converting said spread spectrum signal into an I-channel base band spread spectrum signal and a Q-channel base band spread spectrum signal, correlating the I and Q-channel base band spread spectrum signals with a reference pseudonoise code to respectively produce I and Q-channel correlation values, squaring the I and Q-channel correlation values to produce squared I and Q-channel correlation values, adding the squared I and Q-channel correlation values to produce a sum signal, and generating said correlation signal by performing a square root operation on the sum signal, said receiver comprising:

first peak detecting means for producing a first peak detection value by detecting an uppermost peak value of said correlation signal in response to a first control signal indicative of a starting point and a demodulating point of a data interval;

second peak detecting means for producing a second peak detection value by detecting an uppermost peak value of a portion of said correlation signal in response to said first control signal;

means for generating said first control signal and for producing phase location information signals by dividing said data interval into a plurality of phases;

first peak location detecting means responsive to said first peak detection value for storing and outputting a first peak location signal indicative of the phase location information signal being produced when said first peak location means receives said first peak detection value;

second peak location detecting means responsive to said second peak detection value for storing and outputting a second peak location signal indicative of the phase location information signal being produced when said second peak location means receives said second peak detection value;

comparing means for comparing said first and second peak location signals and for outputting a comparing signal having a state based on a comparison result;

means for outputting a checking signal by checking an initial synchronization establishment state in response to said comparing signal;

first selector means having a selection terminal for receiving said checking signal and having a first input and a second input for respectively receiving said first and second peak location signals, said first selector means selectively outputting one of said first and second peak location signals in response to said checking signal;

second selector means having a selection terminal for receiving said checking signal and having a first input and a second input for respectively receiving said first and second peak detection signals, said second selector means selectively outputting one of said first and second peak detection signals in response to said checking signal;

a timing recovery loop for generating a timing recovery signal in response to one of said first and second peak location signals output by said first selector means for controlling timing of said means for generating said first control signal and for producing said phase location information signals to enable said phase location information to be changed; and data demodulating means connected to receive said I and Q-channel correlation values, and in response to one of said first and second peak detection signals selectively output from said second selector means, demodulating said I and Q-channel correlation values to output data transmitted in said spread spectrum signal.

2. The receiver as set forth in claim 1, said second peak detecting means comprising:

window regulating means for generating a second control signal;

a window filter responsive to said second control signal for limiting a window size of said window filter for passing said portion of said correlation signal and for outputting a "0" value for portions of said correlation signal not passed by said window filter; and a window peak detector connected to an output of said window filter for producing said second peak detection value.

3. The receiver as set forth in claim 1, said means for outputting a checking signal comprising:

a synchronization detector for generating synchronization signals corresponding to input states of said comparing signal.

4. A receiver demodulating a spread spectrum signal in a direct sequence spread spectrum communication system, the receiver comprising:

means for converting a received signal to an intermediate frequency signal;

means for converting the intermediate frequency signal to I and Q-channel base band signals;

means for correlating the I and Q-channel base band signals with a reference pseudonoise code to produce I and Q-channel correlation values, respectively;

means for squaring the I and Q-channel correlation values to produce squared I and Q-channel correlation values;

means for adding the squared I and Q-channel correlation values to produce a sum signal;

means for generating a correlation signal by performing a square root operation on the sum signal;

first peak detecting means for producing a first peak detection value by detecting an uppermost peak value of said correlation signal in response to a first control signal indicative of a starting point and a demodulating point of a data interval;

second peak detecting means for producing a second peak detection value by detecting an uppermost peak value of a portion of said correlation signal in response to said first control signal;

means for generating said first control signal and for producing phase location information signals by dividing said data interval into a plurality of phases;

first peak location detecting means responsive to said first peak detection value for storing and outputting a first peak location signal indicative of the phase location information signal being produced when said first peak location means receives said first peak detection value;

second peak location detecting means responsive to said second peak detection value, for storing and outputting a second peak location signal indicative of the phase location information signal being produced when said second peak location means receives said second peak detection value;

comparing means for comparing said first and second peak location signals and generating for a comparing signal having a state based on a comparison result;

means for generating a checking signal by checking an initial synchronization establishment state in response to said comparing signal;

first selector means having a selection terminal for receiving said checking signal and having a first input port and a second input port for respectively receiving said first and second peak location signals, said first selector means selectively outputting one of said first and second peak location signals in response to said checking signal;

second selector means having a selection terminal for receiving said checking signal and having a first input port and a second input port or respectively receiving said first and second peak detection signals, said second selector means selectively outputting one of said first and second peak detection signals in response to said checking signal;

a timing recovery loop for generating a timing recovery signal in response to one of said first and second peak location signals output by said first selector means for controlling timing of said means for generating said first control signal and for producing said phase location information signals to enable said phase location information to be changed; and data demodulating means connected to receive said I and Q-channel correlation values, and in response to one of said first and second peak detection signals selectively output from said second selector means, demodulating said I and Q-channel correlation values to output data transmitted in said spread spectrum signal.

5. The receiver of claim 4, said second peak detecting means comprising:

window regulating means for generating a second control signal;

a window filter responsive to said second control signal for limiting a window size of said window filter for passing said portion of said correlation signal and for generating a "0" value for portions of said correlation signal not passed by said window filter; and a window peak detector connected to an output of said window filter for producing said second peak detection value.

6. The receiver of claim 5, said means for generating a checking signal comprising:

a synchronization detector for generating synchronization signals corresponding to input states of said comparing signal.

7. The receiver of claim 4, said means for generating a checking signal comprising:

a synchronization detector for generating synchronization signals corresponding to input states of said comparing signal.

8. The receiver of claim 4, said means for converting a received signal to an intermediate frequency signal comprising:

an oscillator for generating a local carrier signal;

a mixer for receiving said spread spectrum signal from an antenna and said local carrier signal, said mixer generating a mixed signal by mixing said spread spectrum signal with said local carrier signal; and a band pass filter for filtering the mixed signal generated by sid mixer to produce said intermediate frequency signal.

9. The receiver of claim 8, said means for converting the intermediate frequency signal to I and Q-channel base band signals comprising:

a second oscillator for generating an oscillation signal;

an I-channel mixer for mixing said intermediate frequency signal and said oscillation signal to produce said I-channel base band signal;

means for phase changing said oscillation signal by $\pi/2$ to produce a phase changed oscillation signal; and a Q-channel mixer for mixing said intermediate frequency signal and said phase changed oscillation signal to produce said Q-channel base band signal.

10. The receiver of claim 4, said means for converting the intermediate frequency signal to I and Q-channel base band signals comprising:

an oscillator for generating an oscillation signal;

an I-channel mixer for mixing said intermediate frequency signal and said oscillation signal to produce said I-channel base band signal;

means for phase changing said oscillation signal by $\pi/2$ to produce a phase changed oscillation signal; and a Q-channel mixer for mixing said intermediate frequency signal and said phase changed oscillation signal to produce said Q-channel base band signal.

11. The receiver of claim 4, said means for correlating the I and Q-channel base band signals with a reference pseudonoise code to produce I and Q-channel correlation values comprising:

a first low pass filter for producing a low pass filtered I-channel base band signal by low pass filtering said I-channel base band signal;

a second low pass filter for producing a low pass filtered Q-channel base band signal by low pass filtering said Q-channel base band signal;

a first analog-to-digital converter for producing a digital I-channel signal by digitizing the low pass filtered I-channel base band signal;

a second analog-to-digital converter for producing a digital Q-channel signal by digitizing the low pass filtered Q-channel base band signal;

a pseudonoise code generator for generating said reference pseudonoise code;

a first digital matching filter for correlating said reference pseudonoise code with said digital I-channel signal to produce said I-channel correlation value; and a second digital matching filter for correlating said reference pseudonoise code with said digital Q-channel signal to produce said Q-channel correlation value.

12. A process for demodulating a spread spectrum signal in a direct sequence spread spectrum communication system comprising:

converting a received signal to an intermediate frequency signal;

converting the intermediate frequency signal to I and Q-channel base band signals;

correlating the I and Q-channel base band signals with a reference pseudonoise code to produce I and Q-channel correlation values, respectively;

squaring the I and Q-channel correlation values to produce squared I and Q-channel correlation values;

adding the squared I and Q-channel correlation values to produce a sum signal;

generating a correlation signal by performing a square root operation on the sum signal;

producing a first peak detection value by detecting an uppermost peak value of said correlation signal in response to a first control signal indicative of a starting point and a demodulating point of a data interval;

producing a second peak detection value by detecting an uppermost peak value of a portion of said correlation signal in response to said first control signal;

generating said first control signal;

producing phase location information signals by dividing said data interval into a plurality of phases;

producing a first peak location signal indicative of the phase location information signal being produced in responsive to said first peak detection value;

producing a second peak location signal indicative of the phase location information signal being produced in response to said second peak detection value;

comparing said first and second peak location signals for producing a comparing signal having a state based on a comparison result;

producing a checking signal by checking an initial synchronization establishment state in response to said comparing signal;

selectively providing one of said first and second peak location signals for further use in response to said checking signal;

selectively providing one of said first and second peak detection signals for further use in response to said checking signal;

generating a timing recovery signal in response to one of said first and second peak location signals selectively provided for controlling timing of the step of generating said first control signal and for enabling a change in said phase location information signals; and demodulating said I and Q-channel correlation values to output data transmitted in said spread spectrum signal in response to one of said selectively provided first and second peak detection signals.

13. The process of claim 12, said step of producing said second peak detection value comprises the steps of:

generating a second control signal;

limiting a window size of a window filter in response to said second control signal for passing said portion of said correlation signal and for generating a "0" value for portions of said correlation signal not passed by said window filter; and producing said second peak detection value in response to the output of said window filter.

14. The process of claim 13, further comprising the steps of:

generating synchronization signals corresponding to input states of said comparing signal.

15. The process of claim 12, further comprising the step of:

generating synchronization signals corresponding to input states of said comparing signal.

* * * * *